(12) United States Patent
Dai et al.

(10) Patent No.: US 10,554,141 B2
(45) Date of Patent: Feb. 4, 2020

(54) PARALLEL HYBRID CONVERTER APPARATUS AND METHOD

(71) Applicant: Futurewei Technologies, Inc., Plano, TX (US)

(72) Inventors: Heping Dai, Plano, TX (US); Liming Ye, Frisco, TX (US); Dianbo Fu, Frisco, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/477,504

(22) Filed: Apr. 3, 2017

(65) Prior Publication Data

US 2017/0207707 A1 Jul. 20, 2017

Related U.S. Application Data

(63) Continuation of application No. 14/548,567, filed on Nov. 20, 2014, now Pat. No. 9,614,453.

(51) Int. Cl.
| | |
|---|---|
| *H02M 3/337* | (2006.01) |
| *H02M 3/07* | (2006.01) |
| *H02M 3/158* | (2006.01) |
| *H02M 3/18* | (2006.01) |
| *H02M 3/335* | (2006.01) |
| *H02M 1/00* | (2006.01) |

(52) U.S. Cl.
CPC ........... *H02M 3/3372* (2013.01); *H02M 3/07* (2013.01); *H02M 3/1582* (2013.01); *H02M 3/18* (2013.01); *H02M 3/337* (2013.01); *H02M 3/33576* (2013.01); *H02M 2001/007* (2013.01); *H02M 2001/0058* (2013.01)

(58) Field of Classification Search
CPC .......................... H02M 3/335; H02M 3/33569
See application file for complete search history.

(56) References Cited

U.S. PATENT DOCUMENTS

| | | | |
|---|---|---|---|
| 7,145,786 B2 | 12/2006 | Vinciarelli | |
| 2008/0298093 A1* | 12/2008 | Jin | H02M 3/285 363/21.06 |
| 2012/0275197 A1 | 11/2012 | Yan et al. | |
| 2013/0083563 A1 | 4/2013 | Wang et al. | |
| 2013/0329463 A1* | 12/2013 | Chen | H02M 1/4258 363/17 |
| 2014/0254203 A1 | 9/2014 | Dai et al. | |
| 2014/0268890 A1* | 9/2014 | Xie | H02M 3/1582 363/16 |

* cited by examiner

*Primary Examiner* — Adolf D Berhane
*Assistant Examiner* — Afework S Demisse
(74) *Attorney, Agent, or Firm* — Slater Matsil, LLP

(57) ABSTRACT

An apparatus comprises an isolated power converter coupled to an input dc power source, wherein the isolated power converter comprises a first switch network coupled to a first transformer winding and a second switch network coupled to a second transformer winding and a non-isolated power converter coupled to the second switch network of the isolated power converter, wherein a current flowing through the non-isolated power converter is a fraction of a current flowing through the isolated power converter.

14 Claims, 6 Drawing Sheets

PARALLEL HYBRID CONVERTER APPARATUS AND METHOD

PRIORITY CLAIM AND CROSS-REFERENCE

This application is a continuation of U.S. patent application Ser. No. 14/548,567, filed on Nov. 20, 2014, entitled "Parallel Hybrid Converter Apparatus and Method", which application is hereby incorporated herein by reference in its entirety.

TECHNICAL FIELD

The present invention relates to a power converter, and, in particular embodiments, to a parallel hybrid power converter.

BACKGROUND

A telecommunication network power system usually includes an AC-DC stage converting the power from the AC utility line to a 48 V DC distribution bus and a DC-DC stage converting the 48 V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12 V bus voltage converted from a 48 V input dc power supply, a 48 V bus voltage converted from a 380 V input dc power supply and a 12 V bus voltage converted from a 380 V input dc power supply. A bus converter not only converts the input voltage from a higher level to a lower level, but also provides isolation through a magnetic device such as transformers and/or the like.

The intermediate bus voltage such as 12 V may function as an input power bus for a plurality of downstream non-isolated power converters. The downstream non-isolated power converters may be implemented as step-down dc/dc converter converters such as buck converters, step-up dc/dc converter converters such as boost converters, linear regulators, any combinations thereof. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by preferred embodiments of the present invention which provide a system, apparatus and method for achieving a high efficiency and tightly regulated power converter.

In accordance with an embodiment, an apparatus comprises an isolated power converter coupled to an input dc power source, wherein the isolated power converter comprises a first switch network coupled to a first transformer winding and a second switch network coupled to a second transformer winding and a non-isolated power converter coupled to the second switch network of the isolated power converter, wherein a current flowing through the non-isolated power converter is a fraction of a current flowing through the isolated power converter.

In accordance with another embodiment, a system comprises an isolated resonant converter comprising a first resonant tank coupled between a first transformer winding and a first switch network and a second resonant tank coupled between a second transformer winding and a second switch network and a non-isolated converter connected to the second switch network, wherein a current flowing through the non-isolated converter is a fraction of a current flowing through the isolated resonant converter.

In accordance with yet another embodiment, a method comprises configuring a non-isolated converter of a hybrid converter to operate at a buck converter mode in response to a first input voltage, wherein the hybrid converter comprises an isolated converter and the non-isolated converter, and wherein a current flowing through the non-isolated converter is a fraction of a current flowing through the hybrid converter and configuring the non-isolated converter to operate at a boost converter mode in response to a second input voltage.

An advantage of a preferred embodiment of the present invention is a high efficiency power converter can be achieved by employing a parallel hybrid power converter comprising an isolated converter and a dc/dc converter, where the total power of the parallel hybrid converter passes the isolated power converter and only a fraction of the total power flows through the dc/dc converter. Such a parallel hybrid power converter is capable of achieve high efficiency as well as tight regulation. In particular, the isolated power converter of the parallel hybrid power conversion topology may be implemented as an unregulated LLC resonant converter having multiple windings. In an embodiment, there may be two secondary windings and their respective rectifiers. The input of the dc/dc converter is coupled to a first secondary winding through a first rectifier. The output of the dc/dc converter is connected in series with an output of the second rectifier. In another embodiment, there may be two primary windings and their respective primary switch networks. The input of the dc/dc converter is coupled to a first primary winding through a first primary switch network. The output of the dc/dc converter is connected in series with an input of a second primary switch network.

The LLC resonant converter may operate at a fixed switching frequency. As a result, the LLC resonant converter may achieve high efficiency through zero voltage switching of the primary switches and zero voltage switching and/or zero current switching of the secondary switches. On the other hand, the dc/dc converter of the parallel hybrid power conversion topology is tightly regulated through adjusting the duty cycle of the dc/dc converter.

Furthermore, only a fraction of the total power of the parallel hybrid power converter passes through both the dc/dc converter and the isolated power converter. As a result, the parallel hybrid power converter may achieve a better efficiency in comparison with conventional two-stage power converters. Moreover, the dc/dc converter helps to improve the transient response of the parallel hybrid power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a parallel hybrid power converter comprising an isolated power converter and a dc/dc converter, where the total power of the parallel hybrid converter passes the isolated power converter and only a fraction of the total power flows through the dc/dc converter. The invention may also be applied, however, to a variety of power converters.

In some embodiments, the isolated power converter may be implemented as full bridge converters, half bridge converters, forward converters, flyback converters, push-pull converters, any combinations thereof and/or the like. The dc/dc converter may be implemented as step-down (buck) converters, step-up (boost) converters, buck-boost converters, any combinations thereof and/or the like. Hereinafter, various embodiments will be explained in detail with reference to the accompanying drawings.

Figure 1:
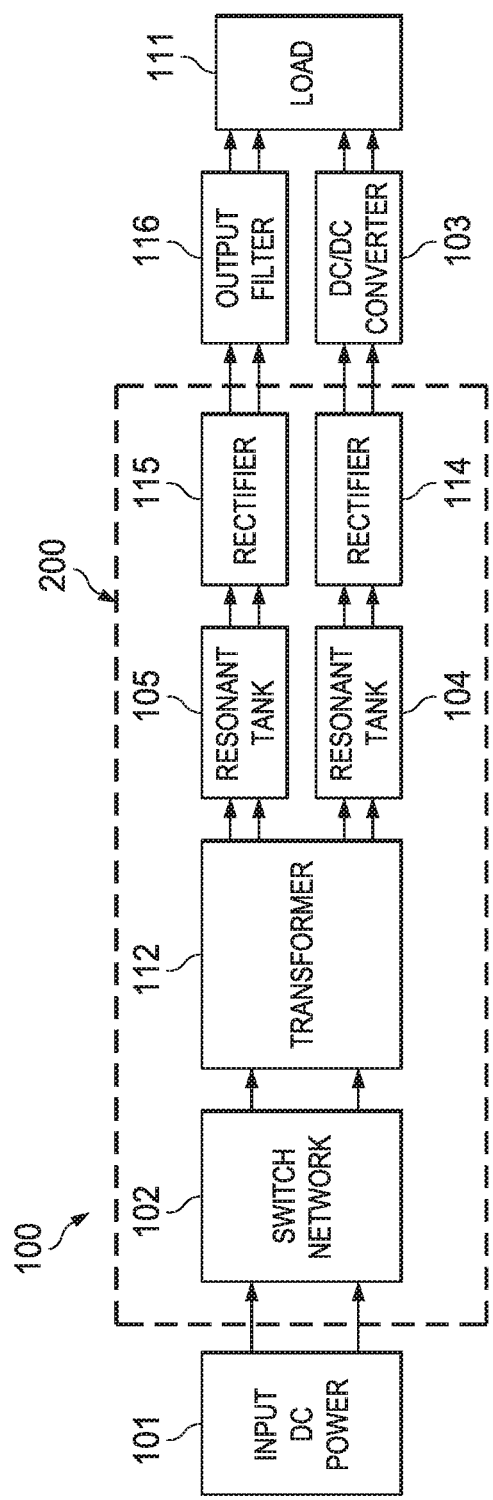
FIG. 1 illustrates a block diagram of a parallel hybrid power converter in accordance with various embodiments of the present disclosure.

FIG. 1 illustrates a block diagram of a parallel hybrid power converter in accordance with various embodiments of the present disclosure. The parallel hybrid power converter 100 comprises an isolated power converter 200 and a dc/dc converter 103. The inputs of the isolated power converter 200 are coupled to outputs of an input dc power source 101. The outputs of the isolated power converter 200 are coupled to a load 111 through an output filter 116 and the dc/dc converter 103 as shown in FIG. 1.

In some embodiments, the power delivered from the input dc power source 101 to the load 111 flows through the isolated power converter 200. At the outputs of the isolated power converter 200, there may be two routes. The majority of the power passes through the output filter 116. A fraction of the power flows through the dc/dc converter 103 and reaches the load 111.

In some embodiments, the isolated power converter 200 may be implemented as a variety of power converters such as full bridge converters, half bridge converters, forward converters, flyback converters, push-pull converters, any combinations thereof and/or the like. In some embodiments, the isolated power converter 200 may be a resonant converter such as an inductor-inductor-capacitor (LLC) resonant converter and/or the like. In particular, the isolated power converter 200 may be an unregulated LLC resonant converter operating at a fixed switching frequency such as the resonant frequency of the LLC resonant converter. Throughout the description, the isolated power converter 200 may be alternatively referred to as an LLC resonant converter 200.

In some embodiments, the dc/dc converter 103 is a non-isolated and regulated power converter. For example, the dc/dc converter 103 may be implemented as a variety of non-isolated power converters such as buck converters, boost converters, buck-boost converters, four-switch buck-boost converters, any combinations thereof and/or the like.

It should be noted the power delivered from the input dc power source 101 is partially through the dc/dc converter 103 as shown in FIG. 1. In fact, the majority of the power may be delivered to the load 111 through the output filter 116. Only a fraction of the power form the input dc power source 101 passes through both the dc/dc converter 103 and the LLC resonant converter 200. As a result, the parallel hybrid power converter 100 is different from a conventional two-stage power converter. In fact, the parallel hybrid power converter 100 is a one-and-half stage power converter.

One advantageous feature of the system configuration described above is the parallel hybrid power converter 100 is capable of achieve high efficiency as well as tight regulation. In particular, the isolated power converter 200 may be implemented as an unregulated LLC resonant converter operating at a fixed switching (e.g., the resonant frequency of the LLC resonant converter). As a result, the LLC resonant converter may achieve high efficiency through zero voltage switching of the primary switches and zero voltage switching and/or zero current switching of the secondary switches. On the other hand, the parallel hybrid power converter 100 is tightly regulated through adjusting the duty cycle of the dc/dc converter 103.

Furthermore, only a fraction of the total power of the parallel hybrid power converter 100 passes through both the dc/dc converter 103 and the LLC resonant converter 200. As a result, the parallel hybrid power converter 100 may achieve a better efficiency in comparison with conventional two-stage power converters (e.g., an isolated power converter and a dc/dc converter connected in cascade between an input dc power source and a load).

The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the parallel hybrid power converter 100. Alternatively, the load 111 may refer to downstream converters coupled to the output of the parallel hybrid power converter 100.

The LLC resonant converter 200 may comprise a switch network 102, a transformer 112, a first resonant tank 104, a second resonant tank 105, a first rectifier 114 and a second rectifier 115. As shown in FIG. 1, the switch network 102 and the transformer 112 are connected in cascade. The transformer 112 may comprise two secondary windings (not shown but illustrated in FIG. 2). These two secondary windings represent the starting points of two power delivery routes.

A first power delivery route includes the first resonant tank 104, the first rectifier 114 and the dc/dc converter 103. As shown in FIG. 1, the first resonant tank 104, the first rectifier 114 and the dc/dc converter 103 are connected in cascade. The second power delivery route includes the second resonant tank 105, the second rectifier 115 and the output filter 116. As shown in FIG. 1, the second resonant tank 105, the second rectifier 115 and the output filter 116 are connected in cascade as shown in FIG. 1. The output of the dc/dc converter 103 and the output of the output filter 116 are connected in series to provide an output voltage of the parallel hybrid power converter 100.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The transformer 112 provides electrical isolation between the primary side and the secondary side of the LLC resonant converter 200. In accordance with an embodiment, the transformer 112 may be formed of three transformer windings, namely a primary winding, a first secondary winding and a second secondary winding. Alternatively, each secondary winding may be replaced by a center tapped secondary winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

In some embodiments, the first resonant tank 104 and the second resonant tank 105 may be of a same structure. For simplicity, only the first resonant tank 104 is described below. The first resonant tank 104 may be implemented in a variety of ways. For example, the main resonant tank comprises a series resonant inductor, a parallel resonant inductor and a series resonant capacitor (shown in FIG. 2 respectively). It should be noted that the series resonant capacitor may be used to reduce interference between the first power delivery route and the second power delivery route. In alternative embodiments, when the parallel hybrid conversion technique is applied to non-resonant converters such as a full bridge converter, a separate capacitor is necessary to reduce interference between the first power delivery route and the second power delivery route.

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

In sum, the first resonant tank 104 includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the first resonant tank 104, the first resonant tank 104 helps to achieve zero voltage switching for the primary side switching elements and zero current switching for the secondary side switching elements.

In some embodiments, the first rectifier 114 and the second rectifier 115 may be of a same structure such as a full-bridge rectifier and/or the like. In alternative embodiments, the first rectifier 114 and the second rectifier 115 may be of different structures. For example, the first rectifier 114 may be a full-bridge rectifier and the second rectifier 115 may be a half-bridge rectifier.

The rectifiers (e.g., first rectifier 114) convert an alternating polarity waveform received from a secondary winding of the transformer 112 to a single polarity waveform. When the transformer 112 is of a center tapped secondary, the rectifiers (e.g., first rectifier 114) may be formed of a pair of switching elements such as n-type metal oxide semiconductor (NMOS) transistors. Alternatively, the rectifiers (e.g., first rectifier 114) may be formed of a pair of diodes. On the other hand, when the transformer 112 is of a non-center tapped secondary winding, the rectifiers (e.g., first rectifier 114) may be a full-bridge rectifier coupled to the secondary winding of the transformer 112.

Furthermore, the rectifiers (e.g., first rectifier 114) may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifiers are well known in the art, and hence are not discussed herein.

The output filter 116 is used to attenuate the switching ripple of the second power delivery route of the LLC resonant converter 200. According to the operation principles of isolated dc/dc converter converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
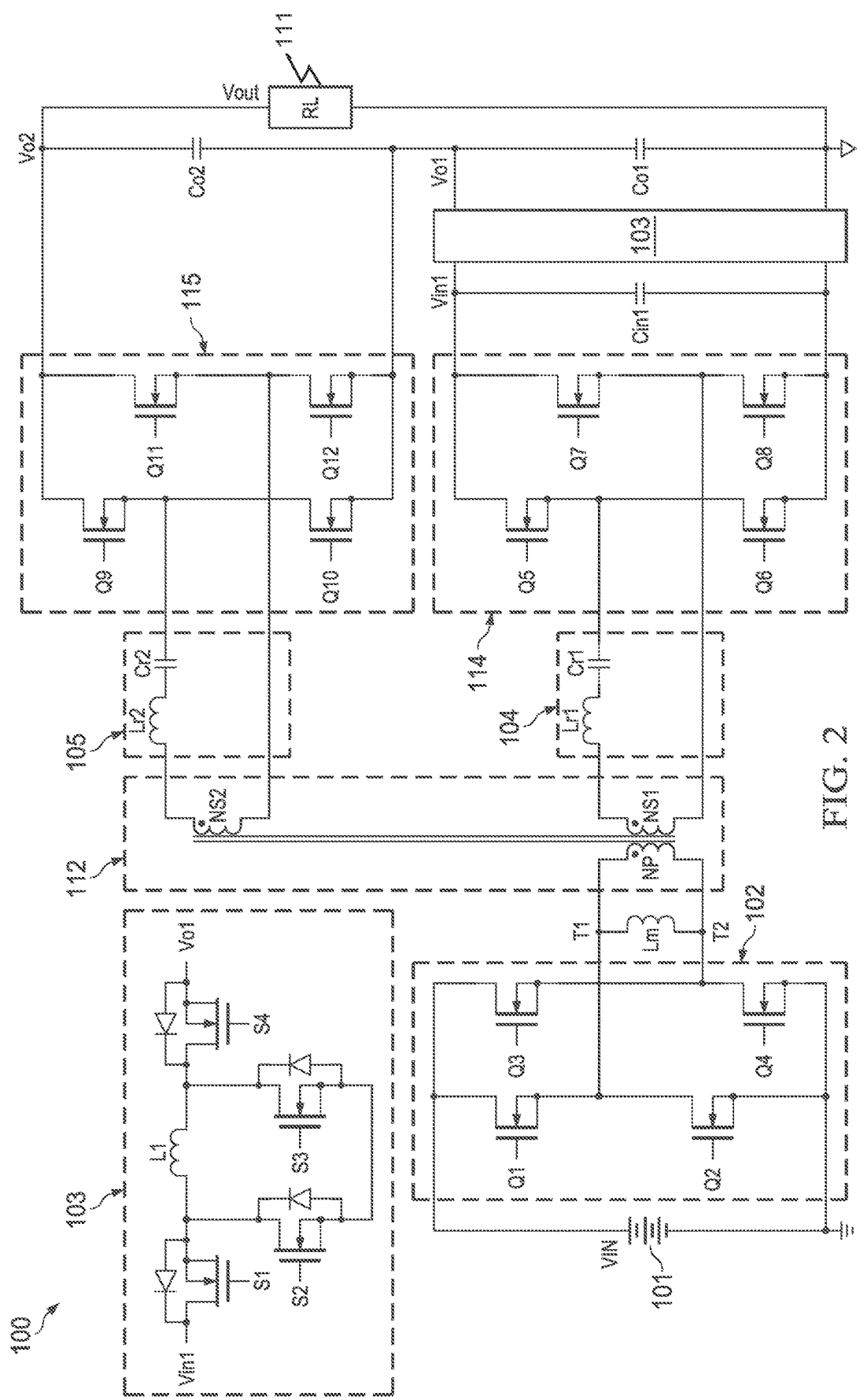
FIG. 2 illustrates a schematic diagram of the parallel hybrid power converter shown in FIG. 1 in accordance with various embodiments of the present disclosure.

FIG. 2 illustrates a schematic diagram of the parallel hybrid power converter shown in FIG. 1 in accordance with various embodiments of the present disclosure. The parallel hybrid power converter 100 comprises the LLC resonant converter 200 and the dc/dc converter 103. As shown in FIG. 2, the LLC resonant converter 200 is a full bridge converter having two secondary sides. A first second side is coupled to the load through the dc/dc converter 103. The second secondary side is coupled to the load directly. In some embodiments, the dc/dc converter 103 is a four-switch buck-boost converter.

It should be noted that the schematic diagram shown in FIG. 2 is merely an example, which should not unduly limit the scope of the claims. One of ordinary skill in the art would recognize many variations, alternatives, and modifications.

The LLC resonant converter 200 comprises the switch network 102, the transformer 112, the first resonant tank 104, the second resonant tank 105, the first rectifier 114 and the second rectifier 115. The switch network 102 includes four switching elements, namely Q1, Q2, Q3 and Q4. As shown in FIG. 2, a first pair of switching elements Q1 and Q2 are connected in series and further coupled between the positive terminal and negative terminal of the input dc power source 101. Likewise, a second pair of switching elements Q3 and Q4 are connected in series and further coupled between the positive terminal and negative terminal of the input dc power source 101.

The common node of the switching elements Q1 and Q2 is coupled to a first input terminal T1 of the transformer 112. Likewise, the common node of the switching elements Q3 and Q4 is coupled to a second input terminal T2 of the transformer 112.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter 200 shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3 and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

The transformer 112 may comprise a primary winding Np, a first secondary winding Ns1 and a second secondary winding Ns2. The primary winding is coupled to terminals T1 and T2 of the resonant tank 104 as shown in FIG. 2. The first secondary winding Ns1 is coupled to the first resonant tank 104. Likewise, the second secondary winding Ns2 is coupled to the second resonant tank 105.

It should be noted the transformer structure shown in FIG. 2 is merely an example. One person skilled in the art will recognize many alternatives, variations and modification. For example, the secondary sides of the transformer 112 may be a center tapped winding. As a result, the secondary sides may employ a synchronous rectifier formed by two switching elements. The operation principle of a synchronous rectifier coupled to a single secondary winding or a center tapped transformer secondary side is well known, and hence is not discussed in further detail herein.

The first resonant tank 104 is formed by a series resonant inductor Lr1, a series resonant capacitor Cr1 and a parallel inductance Lm. As shown in FIG. 2, the series resonant inductor Lr1 and the series resonant capacitor Cr1 are connected in series and further coupled to the first secondary winding Ns1 of the transformer 112.

The second resonant tank 105 is formed by a series resonant inductor Lr2, a series resonant capacitor Cr2 and the parallel inductance Lm. As shown in FIG. 2, the series resonant inductor Lr2 and the series resonant capacitor Cr2 are connected in series and further coupled to the second secondary winding Ns2 of the transformer 112.

It should be noted while FIG. 2 shows the series resonant inductors Lr1 and Lr2 are an independent component, the series resonant inductors Lr1 and/or Lr2 may be replaced by the leakage inductance of the transformer 112. In other words, the leakage inductance (not shown) may function as the series resonant inductors Lr1 and/or Lr2.

It should further be noted that the series resonant inductors Lr1 and Lr2 may be of a low Q. Such a low Q design helps the parallel hybrid power converter 100 achieve high efficiency as well as high power density.

The first rectifier 114 is formed by switches Q5, Q6, Q7 and Q8. As shown in FIGS. 2, Q5 and Q6 are connected in series and further coupled between the positive terminal and negative terminal of a capacitor Cin1. On the other hand, Q7 and Q8 are connected in series and further coupled between the positive terminal and negative terminal of the capacitor Cin1. The common node of Q5 and Q6 is coupled to a first output terminal of the first resonant tank 104. Likewise, the common node of Q7 and Q8 is coupled to a second output terminal of the first resonant tank 104.

The second rectifier 115 is formed by switches Q9, Q10, Q11 and Q12. As shown in FIGS. 2, Q9 and Q10 are connected in series and further coupled between the positive terminal and negative terminal of a capacitor Co2. On the other hand, Q11 and Q12 are connected in series and further coupled between the positive terminal and negative terminal of the capacitor Co2. The common node of Q9 and Q10 is coupled to a first output terminal of the second resonant tank 105. Likewise, the common node of Q11 and Q12 is coupled to a second output terminal of the second resonant tank 105.

According to some embodiments, switches Q5-Q11 are implemented as MOSFET or MOSFETs connected in parallel, any combinations thereof and/or the like. Alternatively, switches Q5-Q11 may be implemented as an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should further be noted that the power topology of the LLC resonant converter 200 may be not only applied to the rectifiers as shown in FIG. 2, but also applied to other secondary configurations, such as voltage doubler rectifiers, current doubler rectifiers, any combinations thereof and/or the like.

In some embodiments, the LLC resonant converter 200 may be an unregulated power converter operating at a frequency approximately equal to the resonant frequency of the first resonant tank 104. As a result, the primary switches (e.g., Q1, Q2, Q3 and Q4) may achieve zero voltage switching and the secondary switches (e.g., Q5-Q11) may achieve zero voltage switching and/or zero current switching. Furthermore, by employing a suitable control mechanism, the switches (e.g., S1, S2, S3 and S4) of the dc/dc converter 103 may achieve zero voltage switching.

In some embodiments, the LLC resonant converter 200 may be an isolated and unregulated stage. The switches (e.g., Q1, Q2, Q3 and Q4) of the LLC resonant converter 200 may operate at a duty cycle of about 50%. The dc/dc converter 103 may be a four-switch buck-boost converter and function as a voltage regulation stage.

As shown in FIG. 2, the dc/dc converter 103 comprises four switching elements, namely S1, S2, S3 and S4. The dc/dc converter 103 further comprises an inductor L1. As shown in FIG. 2, switching elements S1 and S2 are connected in series and further coupled between the positive terminal and negative terminal of the capacitor Cin1. Switching elements S3 and S4 are connected in series and further coupled between the positive terminal and negative terminal of the capacitor Co1. In some embodiments, switching elements S1-S4 and the inductor L1 form a four-switch buck-boost converter.

Depending on different applications and design needs, the dc/dc converter 103 may be configured as a step-up (buck) power converter or a step-down (boost) power converter. In some embodiments, when switching element S4 is always on and switching element S3 is always off, switching elements S1-S2 and inductor L1 form a buck converter. The voltage across the capacitor Co1 is lower than the voltage across the capacitor Cin1. As a result, the dc/dc converter 103 enters a buck converter operation mode. The operation principles of a step-down or buck power converter are well known in the art, and hence are not discussed in detail herein to avoid repetition.

On the other hand, when switching element S1 is always on and switching element S2 is always off, switching elements S3-S4 and inductor L1 form a boost converter. The voltage across the capacitor Co1 is higher than the voltage across the capacitor Cin1. As a result, the dc/dc converter 103 enters a boost converter operation mode. The operation principles of a step-up or boost power converter are well known in the art, and hence are not discussed in detail herein.

According to some embodiments, switching elements S1-S4 are implemented as MOSFET or MOSFETs connected in parallel, any combinations thereof and/or the like. According to alternative embodiments, S1, S2, S3 and S4 may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

One advantageous feature of having the dc/dc converter 103 is that the dc/dc converter 103 helps the parallel hybrid power converter 100 achieve a tight voltage regulation through adjusting the voltage Vo1. Since the regulation of the parallel hybrid power converter 100 is obtained from the dc/dc converter 103, the LLC resonant converter 200 may be configured as an unregulated power converter operating at a fixed switching frequency such as the resonant frequency of the first resonant tank 104. Such a fixed switching frequency helps the LLC resonant converter 200 achieve higher efficiency.

The voltage across the capacitor Co1 of the parallel hybrid power converter 100 may vary based upon different operation modes. When the dc/dc converter 103 operates at a buck converter mode, the voltage at the capacitor Co1 of the parallel hybrid power converter 100 is given by the following equation:

$$Vo1 = D \cdot Vin1 \quad (1)$$

where D is the duty cycle of the switch S1. D is in a range from 0 to 1. As a result, Vo1 is lower than Vin1. In other words, the voltage across the capacitor Co1 may be lower than the voltage across the capacitor Cin1 when the dc/dc converter 103 operates at a buck converter mode.

On the other hand, when the dc/dc converter 103 operates at a boost converter mode, the voltage across the capacitor Co1 of the parallel hybrid power converter 100 is given by the following equation:

$$Vo1 = \frac{1}{1-D} \cdot Vin1 \quad (2)$$

where D is the duty cycle of the switch S3. D is in a range from 0 to 1. The voltage across the capacitor Co1 may be higher than the voltage across the capacitor Cin1.

In sum, the voltage relationship between Vo1 and Vin1 may be expressed by the following equation:

$$Vo1 = G2 \cdot Vin1 \quad (3)$$

where G2 is the gain of the dc/dc converter 103.

In some embodiments, the input voltage of the dc/dc converter 103 is given by the following equation:

$$Vin1 = \frac{G1 \cdot Vin \cdot Ns1}{Np} \quad (4)$$

where G1 is the gain of the LLC resonant converter 200.

In some embodiments, the voltage across the capacitor Co2 is given by the following equation:

$$Vo2 = \frac{G1 \cdot Vin \cdot Ns2}{Np} \quad (5)$$

In some embodiments, the LLC resonant converter 200 is an unregulated LLC resonant converter operating at a switching frequency close to its resonant frequency. As a result, G1 is approximately equal to 1. Equations (4)-(5) above can be simplified as:

$$Vin1 = \frac{Vin \cdot Ns1}{Np} \quad (6)$$

$$Vo2 = \frac{Vin \cdot Ns2}{Np} \quad (7)$$

Substituting Vin1 in Equation (3) with Vin1 in Equation (6), the voltage across the capacitor Co1 is given by the following equation:

$$Vo1 = \frac{G2 \cdot Vin \cdot Ns1}{Np} \quad (8)$$

As shown in FIG. 2, the output voltage of the parallel hybrid power converter 100 is equal to the sum of Vo1 and Vo2. As such, the output voltage of the parallel hybrid power converter 100 is given by the following equation:

$$Vout = Vin \frac{G2 \cdot Ns1 + Ns2}{Np} \quad (9)$$

where Np is the turns of the primary side winding of the transformer 112, Ns1 is the turns of the first secondary side winding of the transformer 112 and Ns2 is the turns of the second secondary side winding of the transformer 112.

In some embodiments, Vin is in a range from 36 V to 60 V. Vo is in a range from 34 V to 55 V. Np, Ns1 and Ns2 are equal to each other. By employing the buck converter mode and the boost converter mode described above, the output voltage of the parallel hybrid power converter 100 can be tightly regulated against load and line by adjusting the gain (e.g., G2) of the dc/dc converter 103.

Both the dc/dc converter 103 and the LLC resonant converter 200 may deliver power to the output of the parallel hybrid power converter 100. A fraction of the power passes through both the dc/dc converter 103 and the LLC resonant converter 200. The rest of the power is delivered from the input dc power source 101 to the load through a single stage (e.g., the LLC resonant converter 200). As such, the power delivered to the load may be divided into two portions, namely Pin1 and Pin2. A first portion Pin1 passes through both the LLC resonant converter 200 and the dc/dc converter 103. A second portion Pin2 is delivered to the load directly through the LLC resonant converter 200. The first portion Pin1 and the second portion Pin2 are proportional to their respective voltages (e.g., Vo1 and Vo2). Pin1 and Pin2 are given by the following equations:

$$\frac{Pin1}{Po} = \frac{Vo1}{Vo1 + Vo2} \quad (10)$$

$$\frac{Pin2}{Po} = \frac{Vo2}{Vo1 + Vo2} \quad (11)$$

where Po is the output power of the parallel hybrid power converter 100.

In some embodiments, the efficiency of the LLC resonant converter 200 is equal to $\eta1$. The efficiency of the dc/dc converter 103 is equal to $\eta2$. In consideration with the efficiency (e.g., $\eta1$ and $\eta2$), the first portion Pin1 and the second portion Pin2 are given by the following equations:

$$Pin1 = \frac{Po}{\eta1 \cdot \eta2} \cdot \frac{Vo1}{Vo1 + Vo2} \quad (12)$$

$$Pin2 = \frac{Po}{\eta1} \cdot \frac{Vo2}{Vo1 + Vo2} \quad (13)$$

The efficiency of the parallel hybrid power converter 100 is given by the following equation:

$$\eta = \frac{Po}{Pin1 + Pin2} = \eta1 \cdot \eta2 \frac{Vo1 + Vo2}{Vo1 + Vo2 \cdot \eta2} \quad (14)$$

In some embodiments, the efficiency of the LLC resonant converter 200 is about 98%. The efficiency of the dc/dc converter 103 is about 92%. In a conventional two-stage power converter (e.g., the LLC resonant converter and the dc/dc converter connected in cascade), the total efficiency of the two-stage power converter is equal to the efficiency of the LLC resonant converter times the efficiency of the dc/dc converter. The total efficiency of the conventional two-stage power converter is approximately equal to 90%. Under the same operating conditions, the efficiency in Equation (14) is higher than the efficiency of the conventional two-stage power converter. More particularly, in order to improve the efficiency of the parallel hybrid power converter 100 shown in FIG. 2, Vo2 may be equal to nine times Vo1. According to Equation (14), the efficiency of the parallel hybrid power converter 100 shown in FIG. 2 is about 97%. In other words, the parallel hybrid power converter 100 shown in FIG. 2 may improve the efficiency by at least 7%.

It should be noted that the parallel hybrid power converter 100 is fully regulated because the dc/dc converter 103 is a tightly regulated power converter. The control of the dc/dc converter 103 includes two operating modes. When an input voltage from the input dc power source 101 is higher than a voltage threshold, the dc/dc converter 103 is configured to operate at a buck converter mode. During the buck converter mode, the regulation of the output voltage of the dc/dc converter 103 is achieved through PWM control.

On the other hand, when the input voltage from the input dc power source 101 is lower than the voltage threshold, the dc/dc converter 103 is configured to operate at a boost converter mode. During the boost converter mode, the regulation of the output voltage of the dc/dc converter 103 is achieved through PWM control. The voltage threshold may vary depending on different design needs and applications.

Figure 3:
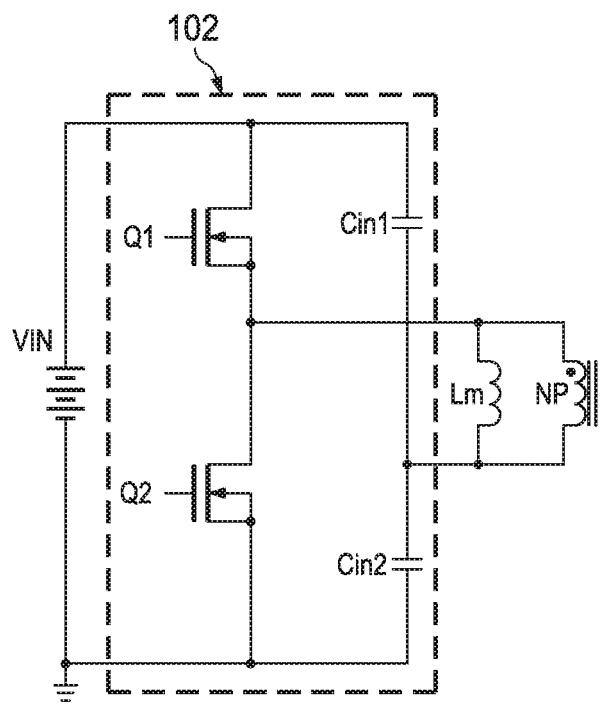
FIG. 3 illustrates a first implementation of the primary side of the isolated power converter shown in FIG. 1 in accordance with various embodiments of the present disclosure.

FIG. 3 illustrates a first implementation of the primary side of the isolated power converter shown in FIG. 1 in accordance with various embodiments of the present disclosure. The primary side of the isolated power converter 200 shown in FIG. 3 is similar to that shown in FIG. 2 except that switching elements Q3 and Q4 are replaced by capacitors Cin1 and Cin2 respectively. One skilled in the art will recognize the primary side shown in FIG. 3 forms a half-bridge isolated converter. The operation principles of the half-bridge isolated converter are well known in the art, and hence are not discussed in further detail herein.

Figure 4:
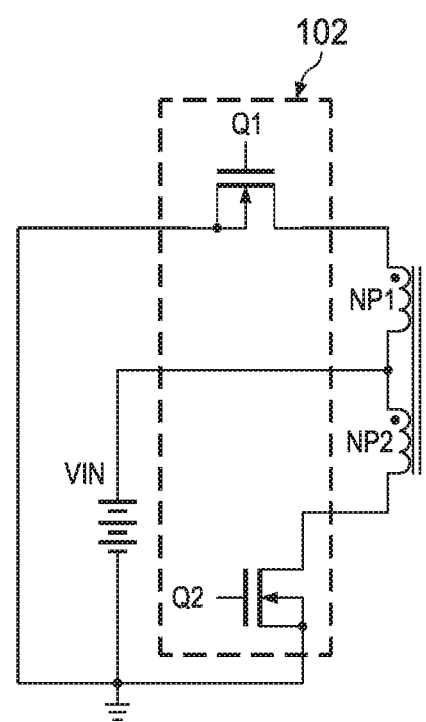
FIG. 4 illustrates a second implementation of the primary side of the isolated power converter shown in FIG. 1 in accordance with various embodiments of the present disclosure.

FIG. 4 illustrates a second implementation of the primary side of the isolated power converter shown in FIG. 1 in accordance with various embodiments of the present disclosure. The primary side of the isolated power converter shown in FIG. 4 is similar to that shown in FIG. 2 except that switching elements Q3 and Q4 have been removed and the transformer has two primary side windings Np1 and Np2. One skilled in the art will recognize the primary side shown in FIG. 4 forms a push-pull isolated converter. The operation principles of the push-pull isolated converter are well known in the art, and hence are not discussed in further detail herein.

It should be noted that the schematic diagrams shown in FIGS. 3-4 are merely an example, which should not unduly limit the scope of the claims. One skilled person in the art will appreciate that there can be many variations.

Figure 5:
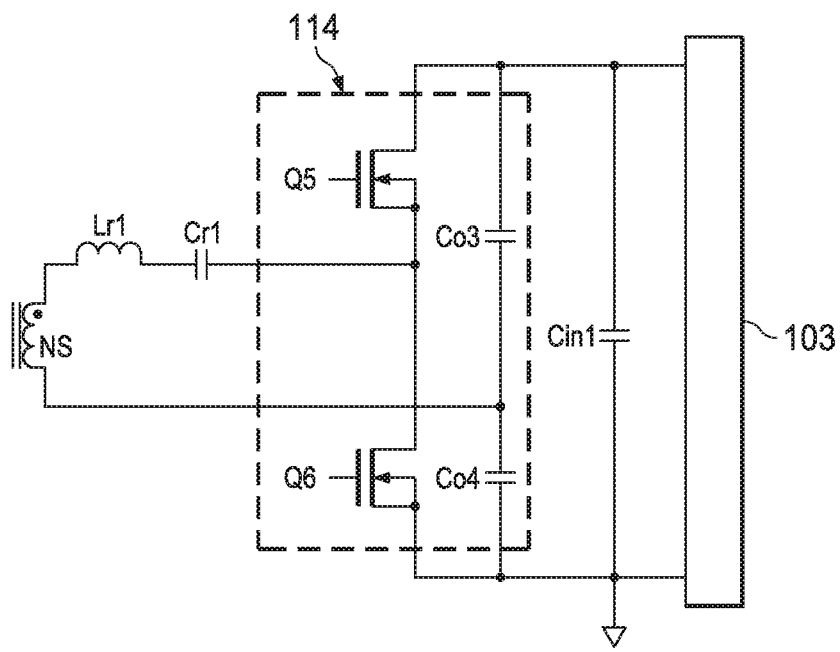
FIG. 5 illustrates a first implementation of the secondary side of the isolated power converter shown in FIG. 1 in accordance with various embodiments of the present disclosure.

FIG. 5 illustrates a first implementation of the secondary side of the isolated power converter shown in FIG. 1 in accordance with various embodiments of the present disclosure. The secondary side of the isolated power converter 200 shown in FIG. 5 is similar to that shown in FIG. 2 except that switching elements Q7 and Q8 are replaced by capacitors Co3 and Co4 respectively. The capacitor Cin1 shown in FIG. 5 may be optional since Co3 and Co4 are connected in series at the input of the dc/dc converter 103. One skilled in the art will recognize the second side forms a half-bridge rectifier. The operation principles of the half-bridge rectifier are well known in the art, and hence are not discussed in further detail herein to avoid unnecessary repetition.

Figure 6:
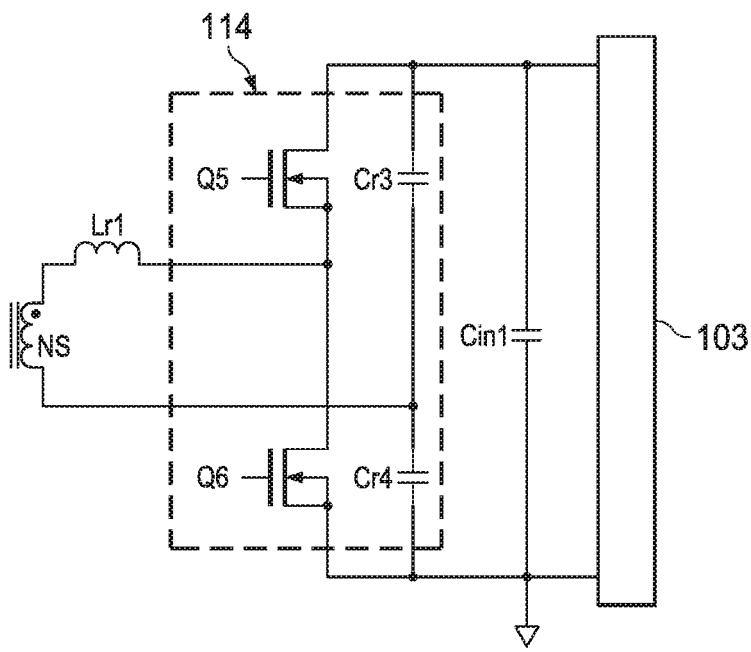
FIG. 6 illustrates a second implementation of the secondary side of the isolated power converter shown in FIG. 1 in accordance with various embodiments of the present disclosure.

FIG. 6 illustrates a second implementation of the secondary side of the isolated power converter shown in FIG. 1 in accordance with various embodiments of the present disclosure. The secondary side of the isolated power converter shown in FIG. 6 is similar to that shown in FIG. 2 except that switching elements Q7 and Q8 are replaced by capacitors Cr3 and Cr4 respectively. The first resonant capacitor Cr1 shown in FIG. 2 may be omitted since Cr3 and Cr4 may replace the function of the first resonant capacitor Cr1. One skilled in the art will recognize the second side forms a half-bridge rectifier. The operation principles of the half-bridge rectifier are well known in the art, and hence are not discussed in further detail herein to avoid repetition.

Figure 7:
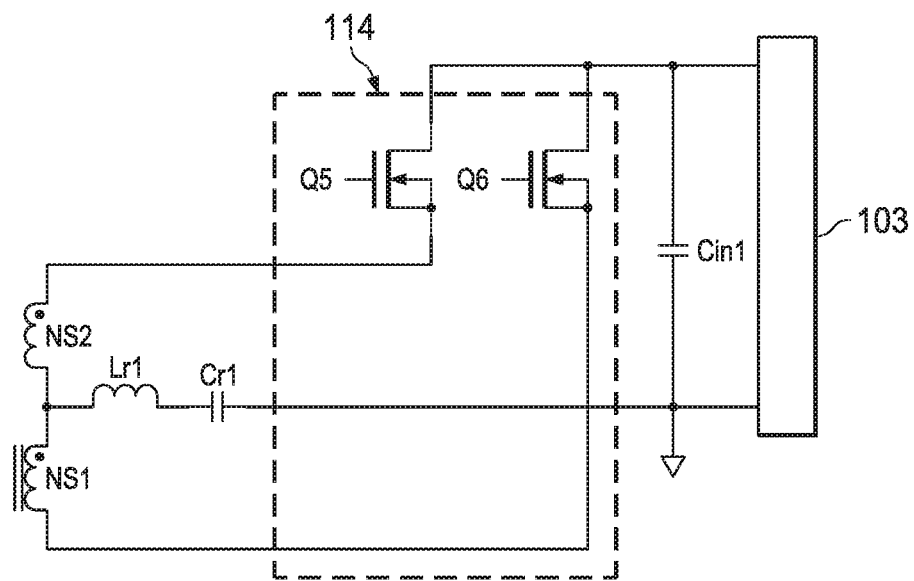
FIG. 7 illustrates a third implementation of the secondary side of the isolated power converter shown in FIG. 1 in accordance with various embodiments of the present disclosure.

FIG. 7 illustrates a third implementation of the secondary side of the isolated power converter shown in FIG. 1 in accordance with various embodiments of the present disclosure. The secondary side of the isolated power converter shown in FIG. 7 is similar to that shown in FIG. 2 except that the single secondary winding has been replaced by a center-tapped secondary winding. The operation principles the center tapped secondary winding and the associated rectifier are well known in the art, and hence are not discussed in further detail herein to avoid repetition.

It should be noted that FIG. 2 is merely an example, which should not unduly limit the scope of the claims. One of ordinary skill in the art would recognize many variations, alternatives, and modifications. For example, one skilled in the art will recognize that any combinations between the implementations of the secondary side shown in FIGS. 5-7 and the implementations of the primary side of the isolated power converter shown in FIGS. 2-4 are within the scope of the present invention. Furthermore, the implementations of the secondary side shown in FIGS. 5-7 are applied to both the first rectifier 114 and the second rectifier 115 shown in FIG. 1.

Figure 8:
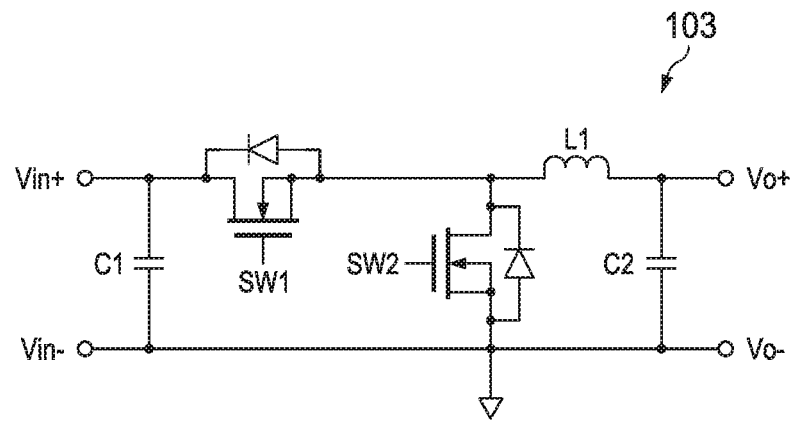
FIG. 8 illustrates a first implementation of the dc/dc converter shown in FIG. 1 in accordance with various embodiments of the present disclosure.

FIG. 8 illustrates a first implementation of the dc/dc converter shown in FIG. 1 in accordance with various embodiments of the present disclosure. The dc/dc converter 103 shown in FIG. 8 is a buck dc/dc converter comprising a first NMOS transistor SW1, a second NMOS transistor SW2, an input capacitor C1, an output capacitor C2 and an output inductor L1. The operation principles of a buck dc/dc converter are well known in the art, and hence are not discussed in further detail herein.

Figure 9:
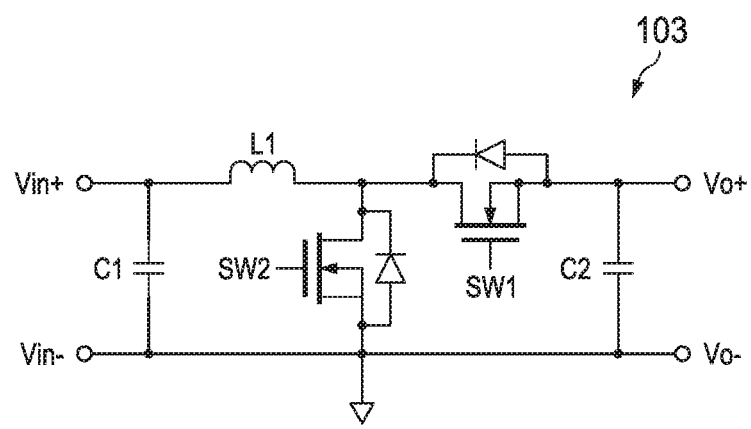
FIG. 9 illustrates a second implementation of the dc/dc converter shown in FIG. 1 in accordance with various embodiments of the present disclosure.

FIG. 9 illustrates a second implementation of the dc/dc converter shown in FIG. 1 in accordance with various embodiments of the present disclosure. The dc/dc converter 103 shown in FIG. 9 is a boost dc/dc converter comprising a first NMOS transistor SW1, a second NMOS transistor SW2, an input capacitor C1, an output capacitor C2 and an output inductor L1. The boost dc/dc converter 103 is used to provide an output voltage higher than an input voltage by modulating the width of a pulse applied to the first NMOS transistor SW1. The operation principles of the boost dc/dc converter are well known in the art, and hence are not discussed in further detail herein.

Figure 10:
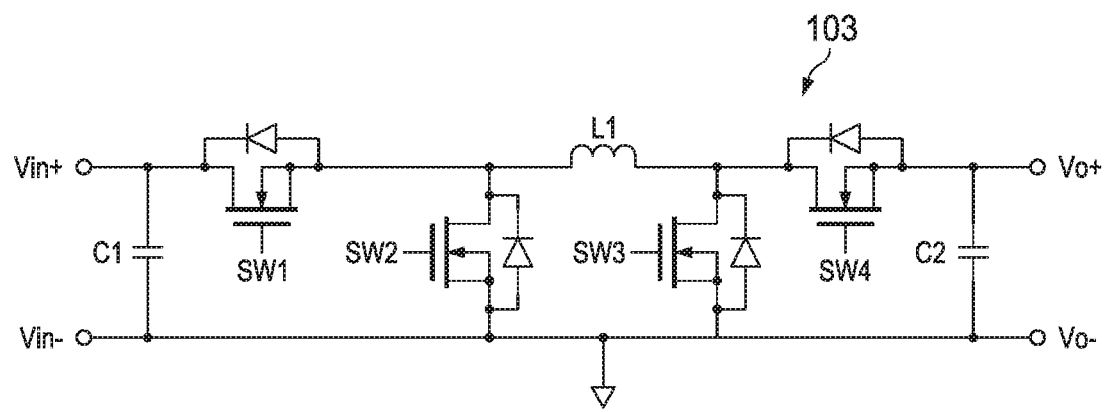
FIG. 10 illustrates a first implementation of the dc/dc converter shown in FIG. 1 in accordance with various embodiments of the present disclosure.

FIG. 10 illustrates a first implementation of the dc/dc converter shown in FIG. 1 in accordance with various embodiments of the present disclosure. The dc/dc converter 103 shown in FIG. 10 is a buck-boost dc/dc converter comprising a buck dc/dc converter plus a boost dc/dc converter. More particularly, when the buck-boost dc/dc converter 103 operates in a step-up mode, the first NMOS transistor SW1 is turned on and the second NMOS transistor SW2 is turned off. As a result, the inductor L1, the third NMOS transistor SW3 and the fourth NMOS transistor SW4 form a boost dc/dc converter having the same system configuration as that of the boost dc/dc converter 103 shown in FIG. 9.

On the other hand, when the buck-boost dc-dc converter operates in a step-down mode, the fourth NMOS transistor SW4 is turned on and the third NMOS transistor SW3 is turned off. As a result, the first NMOS transistor SW1 and the second NMOS transistor SW2 and the inductor L1 form a buck dc/dc converter having the same system configuration as that of the buck dc/dc converter 103 shown in FIG. 8.

Figure 11:
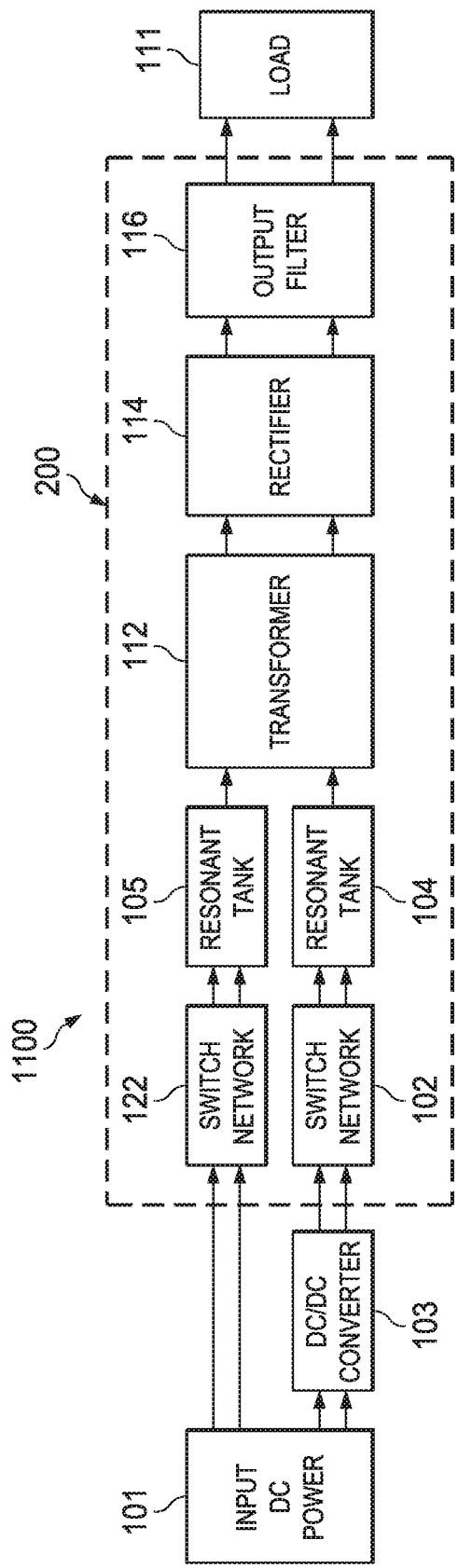
FIG. 11 illustrates a block diagram of another parallel hybrid power converter in accordance with various embodiments of the present disclosure.

FIG. 11 illustrates a block diagram of another parallel hybrid power converter in accordance with various embodiments of the present disclosure. The structure of the parallel hybrid power converter 1100 is similar to the parallel hybrid power converter 100 shown in FIG. 1 except that the dc/dc converter 103 is placed at the primary side of the parallel hybrid power converter 1100. The structures and operating principles of the function units shown in FIG. 11 are similar to those shown in FIG. 1, and hence are not discussed in further detail to avoid repetition.

Figure 12:
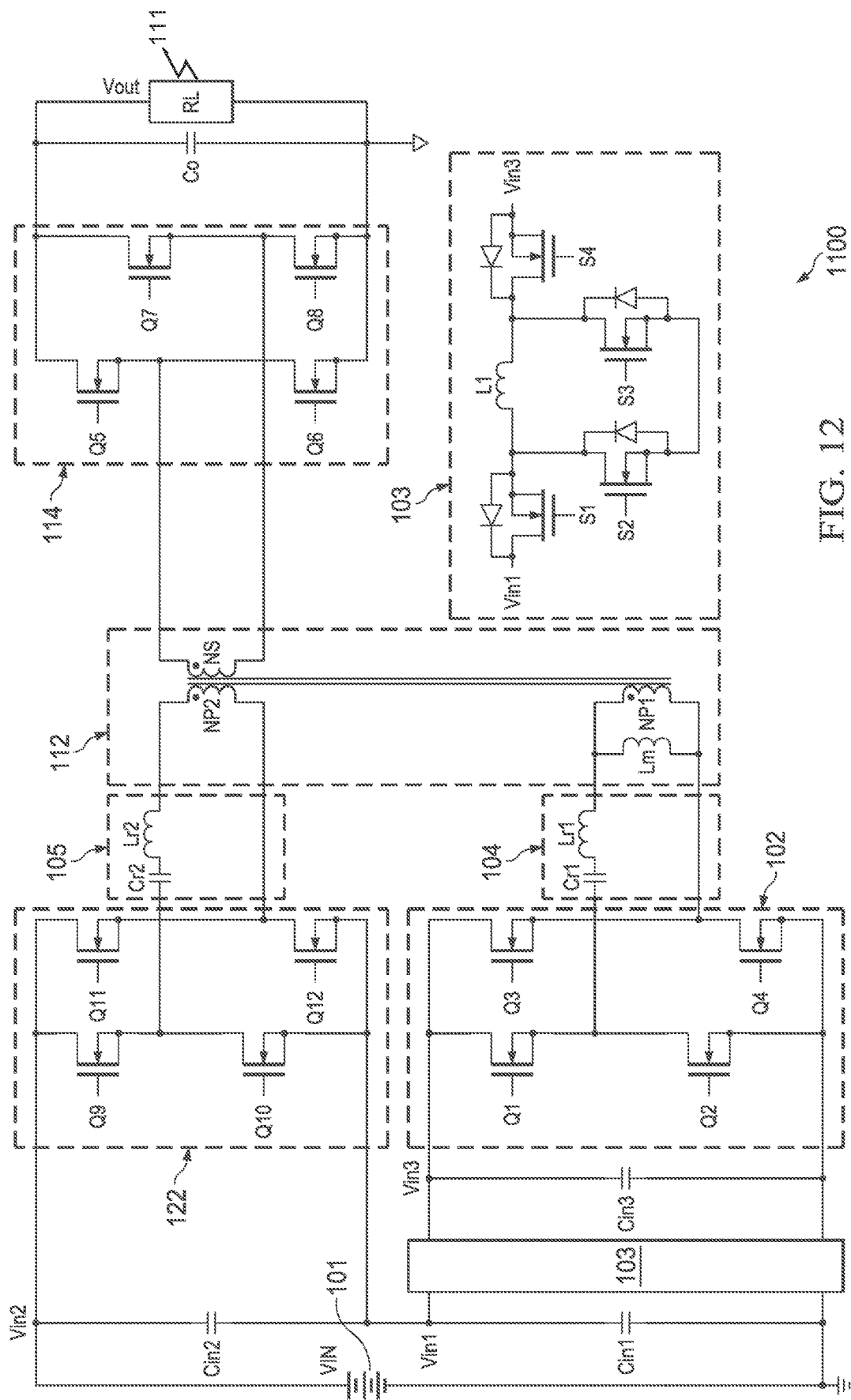
FIG. 12 illustrates a schematic diagram of the parallel hybrid power converter shown in FIG. 11 in accordance with various embodiments of the present disclosure.

FIG. 12 illustrates a schematic diagram of the parallel hybrid power converter shown in FIG. 11 in accordance with various embodiments of the present disclosure. The parallel hybrid power converter 1100 comprises two primary side windings, namely a first primary side winding Np1 and a second primary side winding Np2. The secondary side of the parallel hybrid power converter 1100 includes a first rectifier 114. The structure and operating principle of the first rectifier 114 is well known, and hence are not discussed in detail herein to avoid repetition.

The input dc power source 101 delivers power to the transformer 112 through two routes. The starting point of the first route is at a first input capacitor Cin1. The first route includes the dc/dc converter 103, a first switch network 102 and a first resonant tank 104. The structure and operating principles of each function unit of the first route have been described above with respect to FIG. 2, and hence are not discussed herein to avoid repetition. The starting point of the second route is at a second input capacitor Cin2. The second route includes a second switch network 122 and a second resonant tank 105. As shown in FIG. 11, the first input capacitor Cin1 and the second input capacitor Cin2 are connected in series and further coupled between the positive and negative terminals of the input dc power source 101.

The majority of the power of the parallel hybrid power converter 1100 passes through the second route described above and only a fraction of the total power flows through the first route including the dc/dc converter 103. Such a parallel hybrid power converter is capable of achieve high efficiency as well as tight regulation. In particular, the isolation converter portion of the parallel hybrid power converter 1100 may be implemented as an unregulated LLC resonant converter having two primary windings.

The LLC resonant converter may operate at a fixed switching. As a result, the LLC resonant converter may achieve high efficiency through zero voltage switching of the primary switches and zero voltage switching and/or zero current switching of the secondary switches. On the other hand, the parallel hybrid power conversion topology is tightly regulated through adjusting the duty cycle of the dc/dc converter 103.

The voltage across the capacitor Cin1 of the parallel hybrid power converter 100 may vary based upon different operation modes. When the dc/dc converter 103 operates at a buck converter mode, the voltage at the capacitor Cin1 of the parallel hybrid power converter 100 is given by the following equation:

$$Vin1 = D \cdot Vin3 \qquad (15)$$

where D is the duty cycle of the switch S4. D is in a range from 0 to 1. As a result, Vin1 is lower than Vin3. In other words, the voltage across the capacitor Cin1 may be lower than the voltage across the capacitor Cin3 when the dc/dc converter 103 operates at a buck converter mode.

On the other hand, when the dc/dc converter 103 operates at a boost converter mode, the voltage across the capacitor Cin1 of the parallel hybrid power converter 100 is given by the following equation:

$$Vin1 = \frac{1}{1-D} \cdot Vin3 \qquad (16)$$

where D is the duty cycle of the switch S2. D is in a range from 0 to 1. The voltage across the capacitor Cin1 may be higher than the voltage across the capacitor Cin3.

In sum, the voltage relationship between Vin1 and Vin3 may be expressed by the following equation:

$$Vin1 = G2 \cdot Vin3 \qquad (17)$$

where G2 is the gain of the dc/dc converter 103.

In some embodiments, the voltage across the capacitor Cin3 is given by the following equation:

$$Vin3 = \frac{G1 \cdot Vout \cdot Np1}{Ns} \qquad (18)$$

where G1 is the gain of the LLC resonant converter 200.

In some embodiments, the voltage across the capacitor Cin2 is given by the following equation:

$$Vin2 = \frac{G1 \cdot Vout \cdot Np2}{Ns} \qquad (19)$$

In some embodiments, the LLC resonant converter 200 is an unregulated LLC resonant converter operating at a switching frequency close to its resonant frequency. As a result, G1 is approximately equal to 1. Equations (18)-(19) above can be simplified as:

$$Vin3 = \frac{Vout \cdot Np1}{Ns} \qquad (20)$$

$$Vin2 = \frac{Vout \cdot Np2}{Ns} \qquad (21)$$

Substituting Vin3 in Equation (20) with Vin3 in Equation (17), the voltage across the capacitor Cin1 is given by the following equation:

$$Vin1 = \frac{G2 \cdot Vout \cdot Np1}{Ns} \qquad (22)$$

As shown in FIG. 11, the input voltage of the parallel hybrid power converter 100 is equal to the sum of Vin1 and Vin2. As such, the input voltage of the parallel hybrid power converter 100 is given by the following equation:

$$Vin = Vout \frac{G2 \cdot Np1 + Np2}{Ns} \qquad (23)$$

where Np1 is the turns of the first primary side winding of the transformer 112, Np2 is the turns of the second primary side winding of the transformer 112 and Ns is the turns of the secondary side winding of the transformer 112.

The output voltage of the parallel hybrid power converter 100 is given by the following equation:

$$Vout = Vin \frac{Ns}{G2 \cdot Np1 + Np2} \qquad (24)$$

In some embodiments, Vin is in a range from 36 V to 60 V. Vo is in a range from 34 V to 55 V. Np, Np2 and Ns are equal to each other. By employing the buck converter mode and the boost converter mode described above, the output voltage of the parallel hybrid power converter 1100 can be tightly regulated against load and line by adjusting the gain (e.g., G2) of the dc/dc converter 103.

Both the first route including the dc/dc converter 103 and the second route described above may deliver power to the output of the parallel hybrid power converter 100. In fact, only a fraction of the power passes through the dc/dc converter 103. The majority of the power is delivered from the input dc power source 101 to the load through a single stage (e.g., the second route). As such, the power delivered to the load may be divided into two portions, namely Pin1 and Pin2. A first portion Pin1 passes through the first route including the dc/dc converter 103 and the first switch network 102. A second portion Pin2 is delivered to the load directly through the second switch network 122. The first portion Pin1 and the second portion Pin2 are proportional to their respective voltages (e.g., Vin1 and Vin2). Pin1 and Pin2 are given by the following equations:

$$\frac{Pin1}{Pin} = \frac{Vin1}{Vin1 + Vin2} \quad (25)$$

$$\frac{Pin2}{Pin} = \frac{Vin2}{Vin1 + Vin2} \quad (26)$$

where Pin is the input power of the parallel hybrid power converter 100.

In some embodiments, the efficiency of the LLC resonant converter is equal to η1. The efficiency of the dc/dc converter 103 is equal to η2. In consideration with the efficiency (e.g., η1 and η2), the first portion output power Po1 and the second portion output power Po2 are given by the following equations:

$$Po1 = Pin \cdot \eta1 \cdot \eta2 \cdot \frac{Vin1}{Vin1 + Vin2} \quad (27)$$

$$Po2 = Pin \cdot \eta1 \cdot \frac{Vin2}{Vin1 + Vin2} \quad (28)$$

The efficiency of the parallel hybrid power converter 100 is given by the following equation:

$$\eta = \frac{Po1 + Po2}{Pin} = \eta1 \cdot \eta2 \frac{Vin1 + (Vin2/\eta2)}{Vin1 + Vin2} \quad (29)$$

In some embodiments, the efficiency of the LLC resonant converter 200 is about 98%. The efficiency of the dc/dc converter 103 is about 92%. In a conventional two-stage power converter (e.g., the LLC resonant converter and the dc/dc converter connected in cascade), the total efficiency of the two-stage power converter is equal to the efficiency of the LLC resonant converter times the efficiency of the dc/dc converter. The total efficiency of the conventional two-stage power converter is approximately equal to 90%. Under the same operating conditions, the efficiency in Equation (29) is higher than the efficiency of the conventional two-stage power converter. More particularly, in order to improve the efficiency of the parallel hybrid power converter 1100 shown in FIG. 11, Vin2 may be equal to nine times Vin1. According to Equation (29), the efficiency of the parallel hybrid power converter 1100 shown in FIG. 11 is about 97%. In other words, the parallel hybrid power converter 1100 shown in FIG. 11 may improve the efficiency by at least 7%.

It should be noted that the parallel hybrid power converter 1100 is fully regulated because the dc/dc converter 103 is a tightly regulated power converter. The control of the dc/dc converter 103 includes two operating modes. When an input voltage from the input dc power source 101 is higher than a voltage threshold, the dc/dc converter 103 is configured to operate at a boost converter mode. During the boost converter mode, the regulation of the output voltage of the dc/dc converter 103 is achieved through PWM control.

On the other hand, when the input voltage from the input dc power source 101 is lower than the voltage threshold, the dc/dc converter 103 is configured to operate at a buck converter mode. During the buck converter mode, the regulation of the output voltage of the dc/dc converter 103 is achieved through PWM control. The voltage threshold may vary depending on different design needs and applications.

It should be noted that FIG. 12 is merely an example, which should not unduly limit the scope of the claims. One of ordinary skill in the art would recognize many variations, alternatives, and modifications. For example, one skilled in the art will recognize that any combinations between the implementations of the secondary side shown in FIGS. 5-7 and the implementations of the primary side of the isolated power converter shown in FIGS. 3-4 are within the scope of the present invention. Furthermore, the implementations of the primary side shown in FIGS. 3-4 are applied to both the first switch network 102 and the second switch network 122.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   an isolated power converter coupled to an input dc power source, wherein the isolated power converter comprises:
   a first switch network coupled to a first transformer winding; and
   a second switch network coupled to a second transformer winding, wherein the first transformer winding is electrically isolated from the second transformer winding; and
   a non-isolated power converter coupled to the second switch network of the isolated power converter, wherein a current flowing through the non-isolated power converter is a fraction of a current flowing through the isolated power converter, and wherein the non-isolated power converter is coupled between the second transformer winding and a first input capacitor of the isolated power converter, and the first switch network is coupled between the first transformer winding and a second input capacitor of the isolated power converter, and wherein the first input capacitor and the second input capacitor are connected in series.

2. The apparatus of claim 1, wherein:
   the non-isolated power converter is a four-switch buck-boost converter; and
   the isolated power converter is an inductor-inductor-capacitor (LLC) resonant converter.

3. The apparatus of claim 1, wherein:
   a first terminal of the second input capacitor is connected to a first terminal of the input dc power source;

a second terminal of the second input capacitor is connected to a first terminal of the first input capacitor; and
a second terminal of the first input capacitor is connected to a second terminal of the input dc power source, wherein a voltage potential at the first terminal of the input dc power source is greater than a voltage potential at the second terminal of the input dc power source.

4. The apparatus of claim 1, wherein:
the first transformer winding and the second transformer winding are on a primary side of a transformer and magnetically coupled to a secondary side winding.

5. The apparatus of claim 1, wherein:
the non-isolated power converter is configured to operate at a buck converter mode in response to a first input voltage and operate at a boost converter mode in response to a second input voltage, wherein the first input voltage is higher than the second input voltage.

6. The apparatus of claim 1, wherein:
a power delivered by the second switch network is a fraction of a power delivered by the first switch network.

7. A system comprising:
an isolated resonant converter comprising:
a first resonant tank coupled to a first switch network, wherein the first resonant tank comprises a first series resonant inductor and a first series resonant capacitor, and wherein the first series resonant inductor and the first series resonant capacitor are connected in series and between the first switch network and a first primary side winding; and
a second resonant tank coupled to a second switch network, wherein the second resonant tank comprises a second series resonant inductor and a second series resonant capacitor, and wherein the second series resonant inductor and the second series resonant capacitor are connected in series and between the second switch network and a second primary side winding, and wherein the first primary side winding and the second primary side winding are magnetically coupled to each other; and
a non-isolated converter connected to the second switch network, wherein:
a current flowing through the non-isolated converter is a fraction of a current flowing through the isolated resonant converter.

8. The system of claim 7, wherein the non-isolated converter is a buck-boost converter, and wherein:
the buck-boost converter is configured to operate at a buck converter mode in response to a first input voltage; and
the buck-boost converter is configured to operate at a boost converter mode in response to a second input voltage.

9. The system of claim 8, wherein:
the first input voltage is greater than the second input voltage.

10. A method comprising:
configuring a non-isolated converter of a hybrid converter to operate at a buck converter mode in response to a first input voltage, wherein the hybrid converter comprises an isolated converter and the non-isolated converter, and wherein:
the isolated converter comprises a first switch network, a first input/output capacitor connected to the first switch network, a second switch network and a second input/output capacitor coupled to the second switch network, and wherein the non-isolated converter is connected between the second switch network and the second input/output capacitor, and wherein the first input/output capacitor and the second input/output capacitor are connect in series;
a current flowing through the non-isolated converter is a fraction of a current flowing through the hybrid converter, and an input/output voltage of the non-isolated converter is a fraction of an input/output voltage of the hybrid converter; and
configuring the non-isolated converter to operate at a boost converter mode in response to a second input voltage.

11. The method of claim 10, wherein:
the isolated converter is an inductor-inductor-capacitor (LLC) resonant converter; and
the non-isolated converter is a buck-boost converter.

12. The method of claim 11, further comprising:
regulating the output voltage of the hybrid converter through configuring the buck-boost converter to operate at the buck converter mode when an input voltage of the hybrid converter is higher than a threshold and configuring the buck-boost converter to operate at the boost converter mode when the input voltage of the hybrid converter is lower than the threshold.

13. The method of claim 10, wherein:
configuring the isolated converter to operate in an unregulated mode; and
regulating the output voltage of the hybrid converter through the non-isolated converter.

14. The method of claim 10, wherein:
the first input voltage is greater than the second input voltage.

* * * * *